(12) United States Patent
Endrasik

(10) Patent No.: US 8,355,296 B2
(45) Date of Patent: Jan. 15, 2013

(54) APPARATUS FOR RELATING TIME TO ACTIVITY

(76) Inventor: Poly A. Endrasik, Commerce Township, MI (US)

( * ) Notice: Subject to any disclaimer, the term of this patent is extended or adjusted under 35 U.S.C. 154(b) by 501 days.

(21) Appl. No.: 12/660,547

(22) Filed: Mar. 2, 2010

(65) Prior Publication Data

US 2010/0220554 A1 Sep. 2, 2010

Related U.S. Application Data

(60) Provisional application No. 61/208,797, filed on Mar. 2, 2009.

(51) Int. Cl.
  *G04B 47/00* (2006.01)
  *G04B 45/00* (2006.01)
  *G04B 19/00* (2006.01)
  *G09B 19/12* (2006.01)

(52) U.S. Cl. ............ 368/10; 368/41; 368/223; 368/228; 434/304

(58) Field of Classification Search ............ 368/10, 368/41, 45, 76, 80, 97, 107, 223, 228, 232; 434/304
  See application file for complete search history.

(56) References Cited

U.S. PATENT DOCUMENTS

| | | | | |
|---|---|---|---|---|
| 3,763,648 | A * | 10/1973 | Pakter et al. | 368/41 |
| 3,967,389 | A * | 7/1976 | Brooks | 434/304 |
| 4,124,945 | A * | 11/1978 | Totten | 434/304 |
| 4,208,870 | A * | 6/1980 | Cullom | 368/41 |
| 5,044,961 | A * | 9/1991 | Bruskewitz | 434/304 |
| 5,646,913 | A | 7/1997 | Quesenberry | |
| D416,492 | S * | 11/1999 | Peters | D10/2 |
| 6,416,216 | B1 * | 7/2002 | Haughey | 368/89 |
| 6,836,450 | B2 * | 12/2004 | Gilbert | 368/223 |
| 7,414,923 | B2 | 8/2008 | Kadokura | |
| 7,924,657 | B2 * | 4/2011 | Liebowitz | 368/327 |
| 2001/0023548 | A1 * | 9/2001 | Bundy | 40/446 |
| 2007/0160968 | A1 * | 7/2007 | Shachrur et al. | 434/304 |

* cited by examiner

*Primary Examiner* — Vit W Miska
(74) *Attorney, Agent, or Firm* — Price Heneveld LLP

(57) ABSTRACT

An apparatus for relating time to activity is disclosed. The apparatus discloses an analog clock and a display board having one or more activities where a chosen activity begins at a time indicated by an hour indicator and a minute indicator.

21 Claims, 4 Drawing Sheets

APPARATUS FOR RELATING TIME TO ACTIVITY

CROSS REFERENCE TO RELATED APPLICATION

This application claims priority and benefit from Provisional Application No. 61/208,797 under 35 U.S.C. 119 filed on Mar. 2, 2009, the contents of which are incorporated herein by reference.

BACKGROUND OF THE INVENTION

1. Field of the Invention

The present invention relates to an apparatus for relating time to activity that is useful for teaching children the importance of time management.

2. Description of the Related Art

Being prompt and on time is something that even adults struggle with sometimes. In light of this, it becomes important to cultivate good habits from an early age, when an individual begins to develop the disciplinary skills that will carry through into adulthood.

A number of devices have been developed to assist children in time management. For example, U.S. Pat. No. 5,646,913 to Quesenberry issued on Jul. 8, 1997 discloses a teaching clock with removable repositionable pieces for representing different periods of time. Each piece occupies a sectoral region on the clock face in relation to the hour hand for representing a period of time when a certain activity is to be begin and end.

The above-mentioned device has several shortcomings. One such shortcoming involves the inability to represent a period of time that does not begin or end on the hour. For instance, there is no way of showing the time 3:11. Another shortcoming involves the ineffectiveness of using a minute hand. Although the device discloses a minute hand as an optional feature, it does not show how it can be used to indicate a start time or an end time. Thus, while the device can easily represent an activity to be performed from 1 o'clock to 2 o'clock, the Quesenberry clock is unable to adequately represent an activity that needs to be performed from 1:12 to 2:23, as just one example. Yet another shortcoming is the complexity of the Quesenberry clock as the use of repositionable pieces requires each piece to be cut uniquely and the user is unnecessarily burdened with having to find and attach pieces that adequately represent his or her schedule. Lastly, the user is further burdened because the Quesenberry clock restricts the user to performing activities in hour intervals only.

U.S. Pat. No. 7,414,923 B2 to Kadokura issued on Aug. 19, 2008 discloses a timing device that indicates tasks or events to be completed within a pre-determined routine using customizable and/or changeable discs attached to a mechanical countdown timer.

With respect to the above-mentioned device, several shortcomings are apparent. One such shortcoming is the lack of an actual clock. Thus, although a child may become better aware of the passing of time as it relates to an activity, the child is unable to learn how the passing of time relates to an actual clock, which is equally important when learning how to manage time. Another shortcoming is the inability to represent activities that overlap in time. Since the device works as a countdown timer, it is only able to account for one activity at a time.

While the above inventions accomplish their respective purposes, there is a need for an apparatus that better simulates an actual clock. Also, there is a need for an apparatus that allows a user to schedule activities independently of other activities thereby allowing for activities to overlap. Furthermore, there is a need for an apparatus that can represent a period of time that lasts for any desired duration, taking account of both hours and minutes in a manner that is simple to operate and easily understood.

SUMMARY OF THE INVENTION

The present invention, further enclosed herein, relates to a novel apparatus for relating time to activity. As such, the general purpose of the present invention, which will be described subsequently in greater detail, is to provide a novel apparatus that teaches children how to relate time to the performing of one or more scheduled activities.

To accomplish this, the apparatus comprises an analog clock, an hour indicator, a minute indicator, and an activity display. The analog clock comprises an hour scale that is visually differentiated from the minute scale. Also, the analog clock further comprises an hour hand that is visually related to the hour scale and a minute hand that is visually related to the minute scale. Consequently, it is easily apparent that the hour hand relates to the hour scale and the minute hand relates to the minute scale. Similarly, the hour indicator is visually related to the hour scale and the hour hand while the minute indicator is visually related to the minute scale and the minute hand. Consequently it is easily apparent that the hour indicator relates to the hour scale and the hour hand while the minute indicator relates to the minute scale and minute hand. The activity display indicates an activity that begins when the hour hand points to the hour indicated by the hour indicator and the minute hand points to the minute that is indicated by the minute indicator.

Additionally, the apparatus may include a plurality of activity displays and an activity indicator that informs the child what activity is to be performed. Furthermore, the apparatus may include a plurality of hour indicators, minute indicators, and activity indicators to signal the beginning or the beginning and ending of one or more activities for the advanced user.

Optionally, the apparatus may include a message board and markers for indicating the beginning or the beginning and ending of an activity in a coordinated digital form. In addition, the apparatus may include means to display digital time that is coordinated with the analog clock. Lastly, the apparatus may use an analog clock having a twelve hour scale or a twenty four hour scale for displaying time on the analog clock and may further include a daytime indicator and a nighttime indicator to represent daytime and nighttime.

The novel and optimal features that pertain to the present invention will be better understood from the following drawings and ensuing discussion of preferred embodiment(s). However, it is expressly understood that the drawings and discussion are for illustrative and descriptive purposes and do not in any way define the limits of the present invention.

BRIEF DESCRIPTION OF THE DRAWINGS

The present invention will be better understood when consideration is given to the following detailed description thereof.

DESCRIPTION OF THE PREFERRED EMBODIMENT

Figure 1:
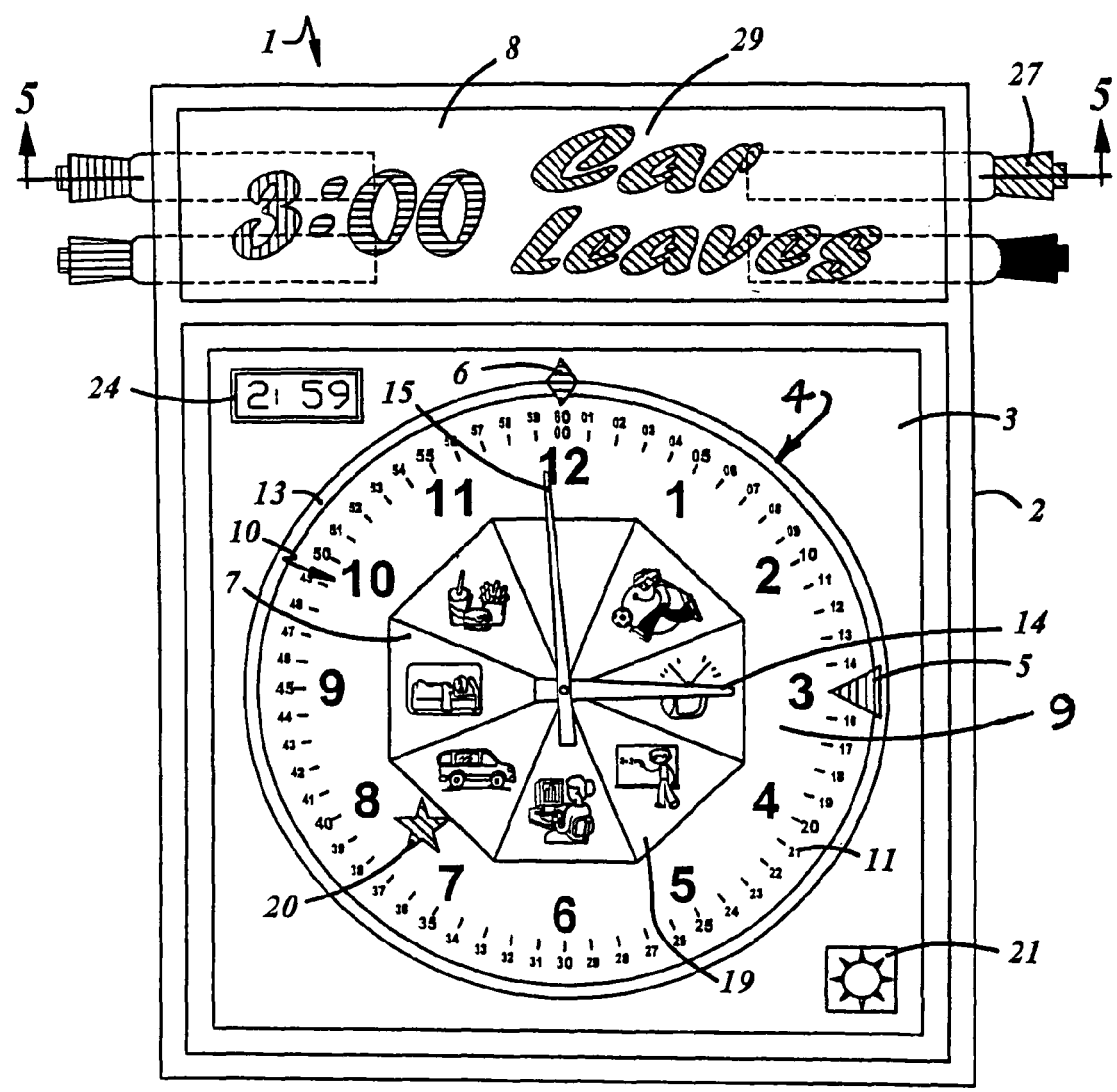
FIG. 1 is a front view of one embodiment of the present invention.

Referring to the drawings in detail, the preferred embodiment of the invention for relating time to activity is illustrated in an apparatus generally designated by the reference number 1 which will be further described herein in detail.

Specifically, with reference to FIG. 1, the apparatus 1 includes a housing 2. The housing 2 is a rigid structure made from any suitable material such as but not limited to wood, metal, or plastic. The housing 2 is preferably a four-sided structure having two front compartments. The first front compartment includes a flat panel 3 that supports the face of an analog clock 4, an hour indicator 5, a minute indicator 6, and an activity display 7. The second front compartment supports a message board 8.

Figure 2:
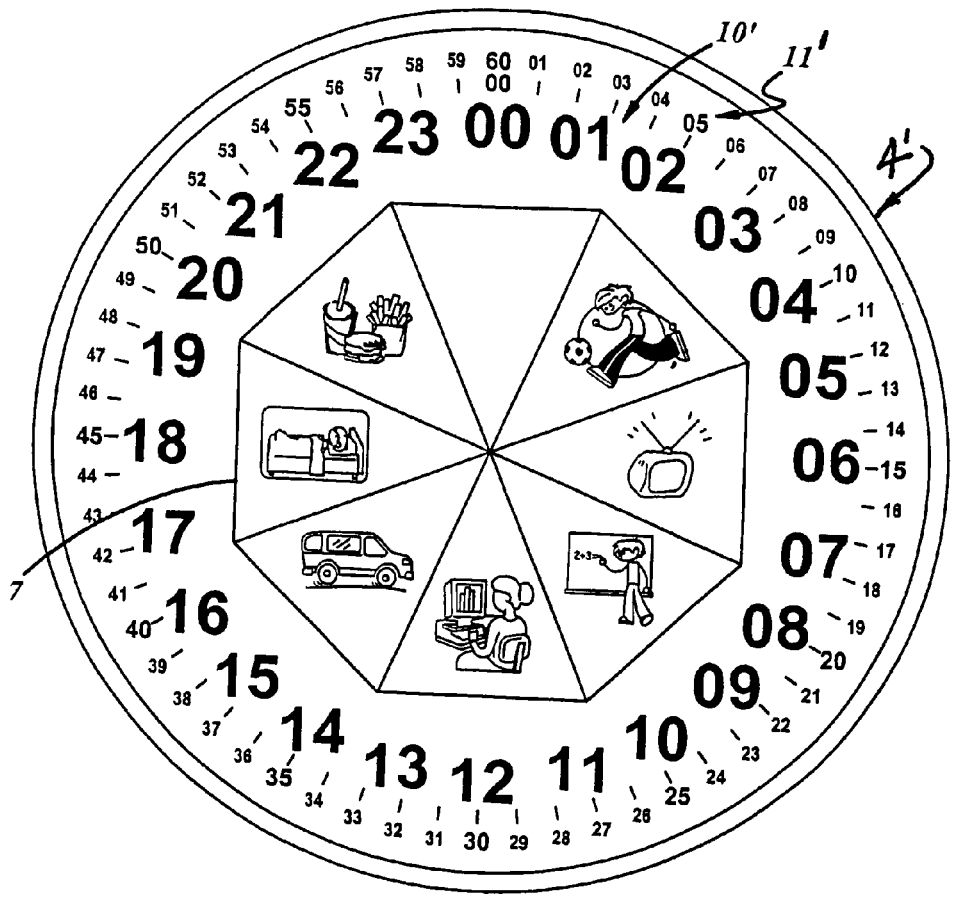
FIG. 2 is a front view of an alternate embodiment of the present invention.

In one embodiment, the flat panel 3 is constructed from a ferro-magnetic material or any other material that is able to attract magnets. The analog clock 4 includes a circular clock face 9 having a twelve-hour scale 10 with a numerical marker at each hour and a sixty-minute scale 11 with a numerical marker at each minute as shown in FIG. 1. Alternatively, the apparatus 1 may have an analog clock 4' with a twenty-four hour scale 10' and a sixty minute scale 11' as shown in FIG. 2.

In the instant embodiment, the minute scale 11 is displayed near an outer rim 13 of the clock face 9 in a concentric manner. The hour scale 10 is more prominently displayed inwardly of the minute scale 11 also in a concentric manner. To aid a child in distinguishing between the two scales, the hour scale 10 and the minute scale 11 are differentiated visually in a significant manner. For instance, the hour scale 10 is displayed in a larger size and a first color, such as red, while the smaller minute scale 11 is displayed in a second color that is different from the first color, such as blue.

Figure 3:
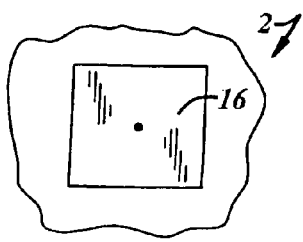
FIG. 3 is a back view of one embodiment of the present invention.

The analog clock 4 has an hour hand 14 and a minute hand 15, both of which operate in conjunction with a timing mechanism 16 located on the back of the panel 3 (see FIG. 3). The hour hand 14, which conventionally is shorter in length relates well to the hour scale 10, which is inwardly of the minute scale and the longer minute hand 15 relates well to the minute scale 10. Moreover, it is preferable to visually relate the hands and scales more prominently. Thus the hour hand 14 is the same color as the hour scale and the minute hand is the same color as the minute scale so the child can easily relate the hour hand 14 as pertaining to the hour scale 10 and the minute hand 15 as pertaining to the minute scale 11. In the instant embodiment, the hour hand 14 is red and the minute hand 15 is blue.

Also, there should be ample room along the outer rim 13 of the clock face 9 to attach an hour indicator 5 and a minute indicator 6. Preferably, the hour indicator 5 and minute indicator 6 are magnetic to allow them to be affixed and removed from the flat panel 3 easily. The hour indicator 5 and minute indicator 6 are visually related to the hour scale 10 and the minute scale 11 respectively. For instance, the hour indicator 5 is the same color as the hour scale 10 and the minute indicator 6 is the same color as the minute scale 11. Likewise, it is desirable to provide the hour indicator 5 as a unique shape that is different than the shape of the minute indicator 6. As shown, the hour indicator 5 is a red triangle and the minute indicator 6 is a blue diamond. Alternatively, a user may use erasable markers having the corresponding colors in place of magnets. Thus, in this alternative embodiment, it is preferable for the flat panel 3 to comprise a surface such as those commonly used in dry erase boards. In this manner, the user can draw and/or erase the hour indicator 5 and the minute indicator 6 as needed.

The activity display 7 is centered in the unoccupied area of the clock face 9 inside the hour scale 10 and the minute scale 11. It is to be noted that the activity display 7 can be any shape, with pie-like sections. For example, the activity display may be octagonal in shape having eight pie-like sections arranged in a concentric manner, whereby up to eight selected activities may be visually displayed such that each pie-like section displays one activity. In instant embodiment, the activities are displayed through a pictorial representation. In another embodiment, the activity display 7 may be prearranged with permanent activities in seven sections and an eighth open section. The open section is for displaying an optimal activity depicted on an activity piece 19. An activity piece 19 displaying a new activity may be attached atop any of the seven sections displaying permanent activities to increase the number of activities that may be displayed.

Alternatively, all eight sections may be initially left open and the activity pieces 19 may be affixed or removed as needed. As such, it is desirable for the activity pieces 19 to be magnetic to allow a user to easily affix and remove activity pieces 19 from the flat panel 3. In this manner, the user may display a single activity when the child begins learning and then display more activities as the child's learning becomes more advanced.

In its simplest use, an activity indicator 20 is affixed on or in the vicinity of the activity that is to be performed, and the hour indicator 5 and the minute indicator 6 are affixed near the hour scale and the minute scale respectively at the hour and the minute when the activity is to begin. These may be easily removed once the activity has ended. In the present embodiment, the activity indicator 20 is a star shaped magnet. The activity indicator 20 should be clearly distinguished from the hour indicator 5 and the minute indicator 6. For instance the activity indictor 20 may be provided in a third color that is different from the first color and the second color to avoid any possible confusion with the hour scale 10 and the minute scale 11 and their respective hour indicators 5 and minute indicators 6. In the instant embodiment, the activity indicator 20 is green. Alternatively, the user may use an erasable marker having the corresponding color instead of the magnet. In this alternative embodiment, it is preferable for the flat panel 3 to comprise a surface such as those commonly used in dry erase boards. Furthermore, the activity pieces may comprise a pre-cut self-stick paper insert.

Figure 4:
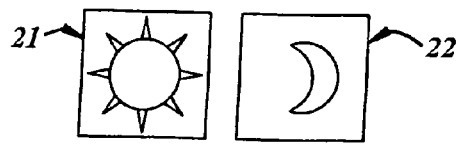
FIG. 4 depicts an AM indicator and a PM indicator used for one embodiment of the invention as shown in FIG. 1.

Optionally, a user may desire to distinguish between daytime and nighttime activities when a twelve-hour scale is used. To accomplish this, a daytime indicator 21 and a nighttime indicator 22, depicting the sun and the moon respectively may be used (see FIG. 4). In this way, the user can affix and remove the appropriate indicators to represent either daytime or nighttime.

The apparatus may also include a digital clock 24 that is in sync with the analog clock 4 as a way to teach a child the correspondence between analog and digital clocks. The digital clock 24 may be located on the upper left region of the flat panel 3 and is coupled to a timing mechanism (not shown) accessible from the back of the housing 2.

Figure 5:
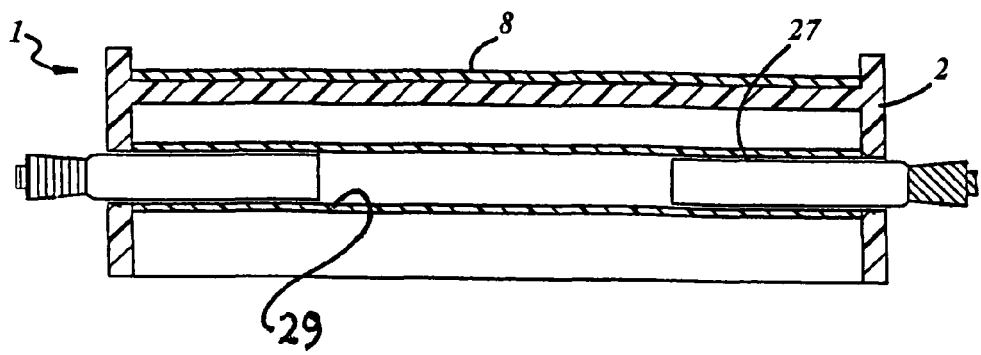
FIG. 5 is a section taken substantially along the line 2 on 2 of FIG. 1 looking in the arrows.
Figure 6:
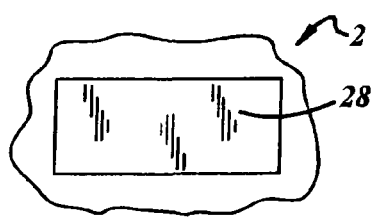
FIG. 6 depicts an optional dial system to represent digital time.

The apparatus preferably includes the message board 8 to indicate the time and activity in written form. The message board 8 is preferably a dry erase board wherein a digital representation of the time shown by the hour indicator 5 and minute indicator 6 can be written by erasable colored markers 27 whereby the hour may be written in the first color (e.g. red) and the minute may be written in the second color (e.g. blue). The activity may also be written in the third color (e.g. green). Once the child becomes more advanced, the time and activity may be written in a fourth color (black). For convenience, the present embodiment further includes two slots 29 on each side of the housing 2 wherein the erasable colored markers 27 can be easily stored and accessed (see FIG. 5). Optionally, a dial system 30 can be substituted to display the time indicated by the hour indicator 5 and the minute indicator 6 in a digital fashion (see FIG. 6). Additionally, the user may write directions on the message board 8 that are to be followed by the child. In the embodiment shown, the message corresponds to the activity that is to be performed by the child and should be written in the same color as the activity indicator 20. Also, the message board 8 may be adorned with decorations such as the alphabet, which may further serve as a training aid.

Figure 7:
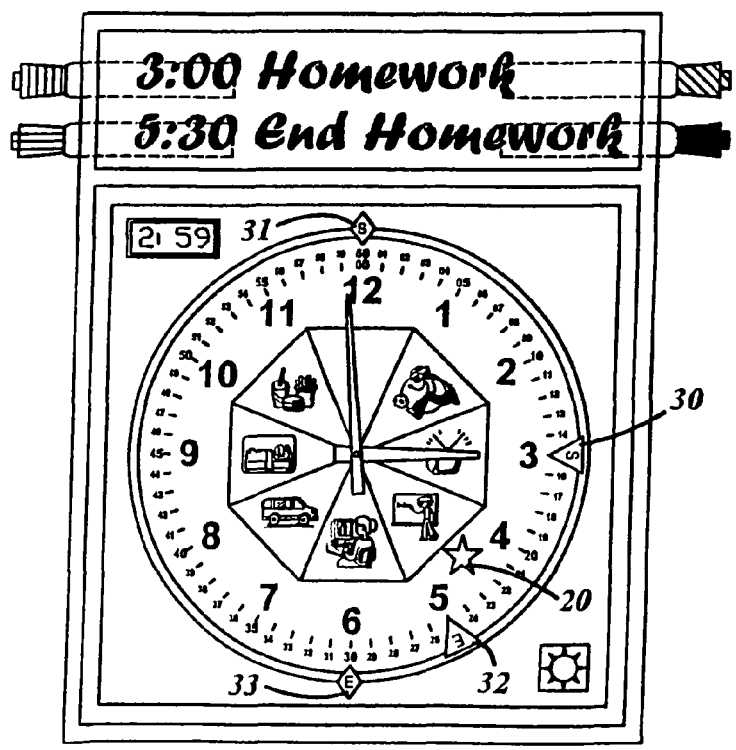
FIG. 7 illustrates the preferred embodiment of the invention having one scheduled activity with a start and end time.
Figure 8:
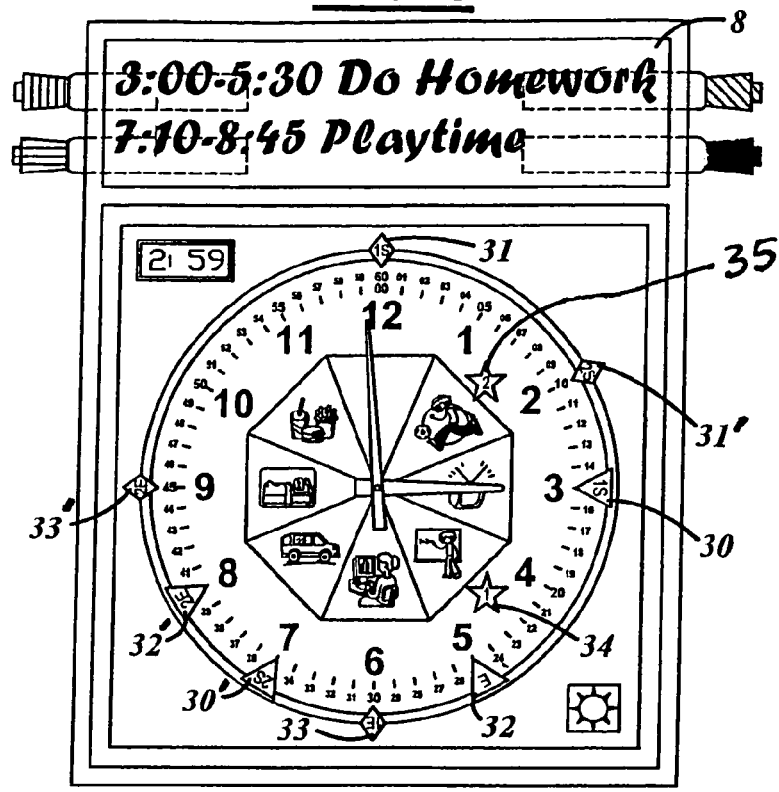
FIG. 8 illustrates one embodiment of the invention having two scheduled activities.

With reference to FIG. 7-8, various levels of use are illustrated. In FIG. 7, the apparatus 1 is shown to include a single activity indicated by an activity indicator 20 that has a start and an end time. Therefore, a first hour indicator 30 and a first minute indicator 31 for indicating the start time and a second hour indicator 32 and a second minute indicator 33 for indicating the end time as required. It is preferable to mark the first hour 30 indicator and the first minute indicator 31 with the letter "S," which stands for "Start" and to mark the second hour indicator 32 and the second minute indicator 33 with the letter "E," which stands for "End." Furthermore, the user may write in the start time and the end time on the message board 8 along with the appropriate accompanying instruction as indicated in FIG. 7. Thus, the advanced child is able to learn when an activity is to begin and when it is to end easily.

Figure 9:
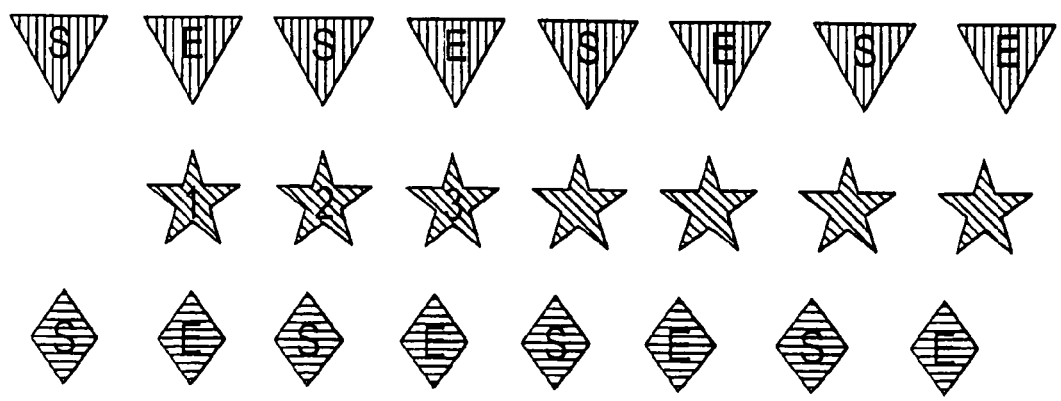
FIG. 9 illustrates a plurality of hour indicators, minute indicators, and activity indicators.

In FIG. 8, the apparatus 1 is shown to comprise two scheduled activities. In this embodiment, the apparatus 1 includes a suitable ordering system that is easily recognized by a child. Preferably, a numerical system is used wherein the first activity indicator 34 is marked with the numeral "1" to represent the first activity to be performed and the second activity indicator 35 is marked by the numeral "2." Thus, subsequent activities will be marked as "3," "4," and so on (see FIG. 9). Similarly, the first hour indicator 30 and the first minute indicator 31 relating to the first activity is marked "1S" and the second hour indicator 32 and the second minute indicator 33 relating to the first activity are marked "1E." Along the same lines, the first hour indicator 30' and the first minute indicator 31' relating to the second activity are marked "2S" and the second hour indicator 32' and the second minute indicator 33' are marked "2E." Also, the user may write the start and end times of both activities on the message board 8 along with the appropriate accompanying instructions. Subsequent activities may be identified in this manner (see FIG. 9). In this way, activities may be displayed independently of each other, regardless of any time overlap. Finally, in the event where a first activity ends at the time a second activity begins, the user may choose to affix the second hour indicator 32 and the second minute indicator 33 of the first activity and the first hour indicator 30 and the first minute indicator 31 of the second activity or the user may choose to only affix the first hour indicator 30 and the first minute indicator 31 of the second activity unless the first activity is to be performed for an indefinite period of time.

Thus, while the invention has been described with reference to specific embodiments, it will be apparent to one skilled in the art that various modifications and equivalents may be made thereto which fall within the scope herein.

I claim:

1. An apparatus for relating time to activity comprising:
an analog clock, said analog clock further comprises a clock face having an hour scale that is visually differentiated from a minute scale, an hour hand, and a minute hand, wherein said hour hand is visually related to said hour scale and said minute hand is visually related to said minute scale;
a changeable hour indicator, wherein said hour indicator is visually related to said hour scale;
a changeable minute indicator, wherein said minute indicator is visually related to said minute scale; and
an activity display for indicating an activity that is to begin at a time corresponding to the hour indicated by said hour indicator and the minute indicated by said minute indicator.

2. The apparatus of claim 1, wherein the analog clock further comprises a clock face that is disposed to receive the changeable hour indicator and the changeable minute indicator.

3. The apparatus of claim 2, wherein the hour scale has a first color and the minute scale has a second color that is different than the first color.

4. The apparatus of claim 3, wherein the hour hand and the changeable hour indicator are the same color as the hour scale and the minute hand and the changeable minute indicator are the same color as the minute scale.

5. The apparatus of claim 4, wherein the changeable hour indicator has a first shape and the changeable minute indicator has a second shape that is different than the first shape.

6. The apparatus of claim 5, wherein the activity display comprises any shape and displays at least one activity.

7. The apparatus of claim 6, wherein the activity display comprises a two dimensional octagon with pie-like sections that is located on the clock face in a third color that is different than the first color and the second color.

8. The apparatus of claim 7, wherein the activity display further comprises at least one activity piece that can be received within an individual pie-like section of the octagon.

9. The apparatus of claim 8, wherein the activity piece displays a pictorial representation of an activity.

10. The apparatus of claim 9, wherein the activity display can receive an activity indicator.

11. The apparatus of claim 10, wherein the activity indicator is a third shape and the same color as the activity display.

12. The apparatus of claim 11, further comprising a plurality of hour indicators, minute indicators, and activity indicators.

13. The apparatus of claim 12, further comprising a housing that can receive the analog clock, at least one hour indicator, at least one minute indicator, and the activity display.

14. The apparatus of claim 13, wherein the housing further comprises a message board.

15. The apparatus of claim 14, wherein the message board further comprises a digital display having an hour unit and a minute unit.

16. The apparatus of claim 15, wherein the digital display is chosen from the group consisting of written, dial, and electronic.

17. The apparatus of claim 13, wherein the hour unit is the first color and the minute unit is the second color.

18. The apparatus of claim 15, wherein the message board comprises a dry erase board.

19. The apparatus of claim 16, wherein the housing member can receive a plurality of writing utensils.

20. The apparatus of claim 17, wherein the housing can receive a digital clock.

21. The apparatus of claim 18, wherein the housing can receive an AM indicator and a PM indicator.

* * * * *